United States Patent
Pelmear

(10) Patent No.: US 9,915,209 B2
(45) Date of Patent: Mar. 13, 2018

(54) INTERNAL COMBUSTION ENGINE AND METHOD OF OPERATING SAME

(71) Applicant: Douglas A. Pelmear, Napoleon, OH (US)

(72) Inventor: Douglas A. Pelmear, Napoleon, OH (US)

(*) Notice: Subject to any disclaimer, the term of this patent is extended or adjusted under 35 U.S.C. 154(b) by 0 days.

(21) Appl. No.: 14/615,995

(22) Filed: Feb. 6, 2015

(65) Prior Publication Data

US 2015/0184598 A1    Jul. 2, 2015

Related U.S. Application Data

(63) Continuation of application No. 14/082,286, filed on Nov. 18, 2013, now Pat. No. 8,991,356, which is a
(Continued)

(51) Int. Cl.
*F02D 17/02* (2006.01)
*F02B 77/14* (2006.01)
*H02K 7/18* (2006.01)
*H02K 33/16* (2006.01)
*H02K 53/00* (2006.01)
*F01M 1/02* (2006.01)
(Continued)

(52) U.S. Cl.
CPC ............. *F02D 17/02* (2013.01); *F01M 1/02* (2013.01); *F02B 75/18* (2013.01); *F02B 77/14* (2013.01); *F02F 1/18* (2013.01); *H02K 7/1884* (2013.01); *H02K 33/16* (2013.01); *H02K 53/00* (2013.01); *F02B 63/04* (2013.01); *F02B 2075/1832* (2013.01); *H01T 13/00* (2013.01)

(58) Field of Classification Search
CPC ... F01M 1/02; F02D 17/02; F02F 1/18; F02B 75/18; H02K 33/16; H02K 33/18
See application file for complete search history.

(56) References Cited

U.S. PATENT DOCUMENTS 1,351,763 A    9/1920    Kirkham
3,662,723 A    5/1972    Buhl
(Continued)

FOREIGN PATENT DOCUMENTS

CN    101185228 A    5/2008

OTHER PUBLICATIONS

"Project No-Flight Update" (Retrieved from the Internet) http://www.gregorypage.net/jan02/65corvette4.htm; Printed on Jun. 25, 2010.

*Primary Examiner* — Kevin A Lathers
(74) *Attorney, Agent, or Firm* — MacMillan, Sobanski & Todd, LLC

(57) ABSTRACT

An internal combustion engine and a method for maximizing fuel efficiency of an internal combustion engine. The internal combustion engine includes an engine block assembly having an electromagnet coupled thereto and an engine component movable relative to the engine block assembly. The engine component includes a permanent magnet coupled thereto. A control system is provided to selectively provide an electrical current to the electromagnet to produce a desired magnetic field, wherein the magnetic field of the electromagnet cooperates with a magnetic field of the permanent magnet to affect a motion of the engine component in respect of the engine block assembly.

11 Claims, 8 Drawing Sheets

Related U.S. Application Data continuation of application No. 12/780,637, filed on May 14, 2010, now Pat. No. 8,616,175.

(60) Provisional application No. 61/178,742, filed on May 15, 2009, provisional application No. 61/251,876, filed on Oct. 15, 2009.

(51) Int. Cl.
- *F02B 75/18* (2006.01)
- *F02F 1/18* (2006.01)
- *F02B 63/04* (2006.01)
- *H01T 13/00* (2006.01)

(56) References Cited

U.S. PATENT DOCUMENTS

| | | | |
|---|---|---|---|
| 4,213,428 A | 7/1980 | Bradley | |
| 4,510,420 A | 4/1985 | Sasso | |
| 4,631,455 A * | 12/1986 | Taishoff | F02B 63/04 290/1 R |
| 5,457,349 A | 10/1995 | Gifford | |
| 5,469,004 A | 11/1995 | Jachim | |
| 5,592,036 A | 1/1997 | Pino | |
| 5,711,614 A | 1/1998 | Wuest et al. | |
| 5,762,039 A | 6/1998 | Gonzalez | |
| 5,881,686 A | 3/1999 | Schmidt | |
| 6,230,680 B1 | 5/2001 | Pirone | |
| 6,360,724 B1 | 3/2002 | Suhre et al. | |
| 6,928,974 B1 | 8/2005 | Markou | |
| 6,928,988 B2 | 8/2005 | Nishigaki | |
| 7,258,094 B1 | 8/2007 | Pelmear | |
| 7,793,634 B2 * | 9/2010 | Elmaleh | F02B 63/04 123/197.1 |
| 2004/0112346 A1 * | 6/2004 | Ahlborn | F01M 13/021 123/572 |
| 2008/0079320 A1 * | 4/2008 | Beaulieu | F02B 63/04 310/15 |

* cited by examiner

INTERNAL COMBUSTION ENGINE AND METHOD OF OPERATING SAME

CROSS-REFERENCE TO RELATED APPLICATION

This application is a continuation patent application of U.S. patent application Ser. No. 14/082,286 filed Nov. 18, 2013, which is a continuation patent application of U.S. Pat. No. 8,616,175, which claims the benefit of U.S. Provisional Pat. Appl. Ser. No. 61/178,742 filed May 15, 2009 and U.S. Provisional Pat. Appl. Ser. No. 61/251,876 filed Oct. 15, 2009, each of which is hereby incorporated herein by reference in its entirety.

FIELD OF THE INVENTION

The invention relates to an internal combustion engine, and more particularly to an engine block and associated components, and a method of operating same for maximizing fuel efficiency of the internal combustion engine.

BACKGROUND OF THE INVENTION

Hydrocarbon based fuels are the primary fuels employed to power internal combustion engines. Such fuels are derived from a limited supply of oil found on the earth. As the population of humans increases, the use of internal combustion engines and the demand for hydrocarbon based fuels to power internal combustion engines increases.

It is likely that the production of hydrocarbon based fuels from the limited supply of oil will not keep pace with growing demands. Further, it can be anticipated that at some point in time, the limited supply of oil will be exhausted.

One strategy to reduce the demand for hydrocarbon based fuels has been to use alternative fuels such as ethanol, natural gas, and hydrogen, for example, to power internal combustion engines. However, alternative fuels currently have limited availability. Making alternative fuels readily available to consumers will require significant capital investment in production facilities for alternative fuels and an infrastructure to distribute alternative fuels.

The production of alternative fuels typically requires consuming other resources such as electric energy to produce hydrogen and corn to produce ethanol, for example. The production of alternative fuels also can require the consumption of hydrocarbon based fuels. Accordingly, whether traditional hydrocarbon fuels or alternative fuels are employed, increased fuel efficiency of internal combustion engines is required to minimize the consumption of oil and other natural resources.

It would be desirable to produce an internal combustion engine and a method of operating the same, wherein the consumption of fuel by the internal combustion engine is minimized.

SUMMARY OF THE INVENTION

Compatible and attuned with the present invention, an internal combustion engine and a method of operating the same, wherein the consumption of fuel by the internal combustion engine is minimized, has surprisingly been discovered.

In one embodiment, an engine comprises an engine block assembly including an electromagnet; an engine component disposed in and movable relative to the engine block assembly, the engine component including a permanent magnet; and a control system adapted to selectively provide an electrical current to the electromagnet to produce a desired magnetic field, wherein the magnetic field of the electromagnet cooperates with a magnetic field of the permanent magnet to affect a motion of the engine component in respect of the engine block assembly.

In another embodiment, an engine comprises an engine block having at least one cylinder bank including a plurality of cylinder bores formed therein; a piston reciprocatingly disposed in each of the cylinder bores; a crankshaft rotatably mounted to the engine block; a plurality of connecting rods having a first end and a second end, the first end rotatably attached to the crankshaft and the second end coupled to the piston; a cylinder head mounted to the cylinder bank and covering the cylinder bores, the cylinder head including an intake valve and an exhaust valve in fluid communication with each of the cylinder bores; an oil pan mounted to a lower end of the engine block to form a crankcase area of the engine; a plurality of electromagnets disposed in the engine block; a plurality of permanent magnets disposed in at least one of the piston and the crankshaft; and a control system selectively providing an electrical current to the electromagnets to produce a desired magnetic field, wherein the magnetic field of the electromagnets cooperates with a magnetic field of the permanent magnets to affect a motion of the piston and the crankshaft in respect of the engine block.

The above object may typically be achieved by a method for maximizing fuel efficiency of an engine comprising the steps of providing an engine including an engine block having a cylinder bank including a plurality of cylinder bores formed therein, a piston reciprocatingly disposed in each of the cylinder bores, a crankshaft rotatably mounted to the engine block, a plurality of connecting rods having a first end and a second end, the first end rotatably attached to the crankshaft and the second end coupled to the piston, wherein a burning of a fuel within the cylinder bores causes a reciprocating motion of the pistons and a rotation of the crankshaft in respect of the engine block; providing a plurality of electromagnets with the engine block; providing a plurality of permanent magnets with at least one of the piston and the crankshaft; and providing a control system to selectively provide an electrical current to the electromagnets to produce a desired magnetic field, wherein the magnetic field of the electromagnets cooperates with a magnetic field of the permanent magnets to affect a motion of the piston and the crankshaft in respect of the engine block.

BRIEF DESCRIPTION OF THE DRAWINGS

The above objects and advantages of the invention will become readily apparent to those skilled in the art from reading the following detailed description of an embodiment in the light of the accompanying drawings, in which.

DETAILED DESCRIPTION OF THE PREFERRED EMBODIMENT OF THE INVENTION

The following detailed description and appended drawing describe and illustrate various exemplary embodiments of the invention. The description and drawings serve to enable one skilled in the art to make and use the invention, and are not intended to limit the scope of the invention in any manner. In respect of the methods disclosed and illustrated, the steps presented are exemplary in nature, and thus, the order of the steps is not necessary or critical.

Figure 1:
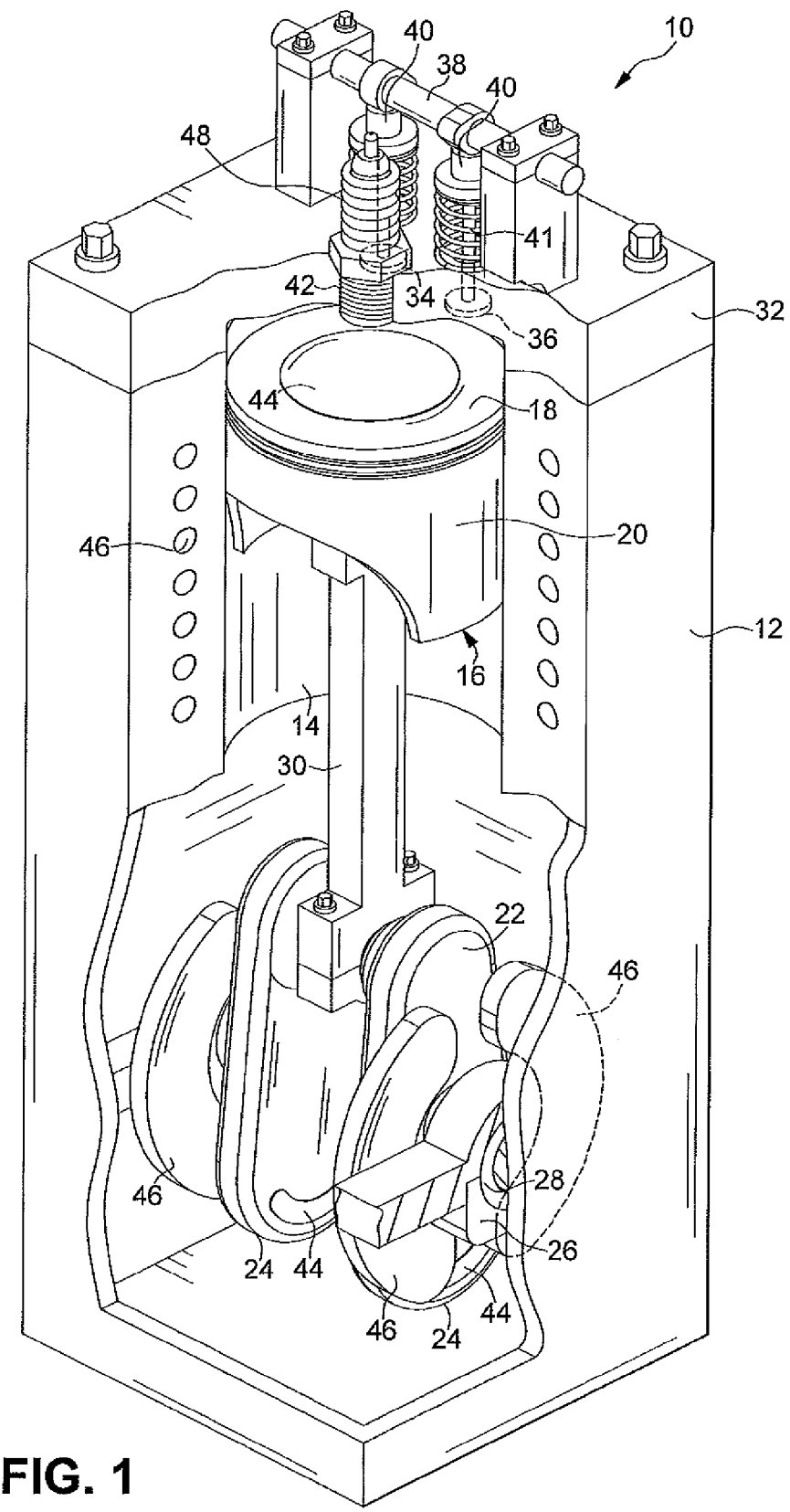
FIG. 1 is a perspective view of a rod and piston type internal combustion engine having an electromagnetic propulsion system with a portion of an engine block and a cylinder head cut away.

Referring to FIG. 1, there is shown a rod and piston type internal combustion engine 10 adapted to maximize a fuel efficiency thereof. The engine 10 includes an engine block 12 having at least one cylinder bore 14 formed therein adapted to reciprocatingly receive a piston 16. The piston 16 includes a top surface 18 and a skirt 20 depending therefrom. It should be understood that the engine 10 can be single cylinder engine or a multiple cylinder engine in a V, an inline, and an opposing cylinder bore configuration, for example. Additionally, it should be understood that the engine can be a four cycle or a two cycle engine, and can be based on the Otto cycle, Miller cycle, Scuderi split-cycle, or any other engine cycle now know or later developed. Further, the engine 10 can be adapted to burn diesel fuel, gasoline, ethanol, hydrogen, or any other suitable fuel now know or later discovered, and combinations of such fuels.

A crankshaft 22 having at least one throw 24 is rotatably mounted to a lower end of the engine block 12 employing a plurality of main caps 26 and associated main bearings 28. A connecting rod 30 is provided to connect the piston 16 to the crankshaft 22. One end of the connecting rod 30 is rotatably mounted to the crankshaft 22. The connecting rod 30 extends into the cylinder bore 14 and an opposite end of the connecting rod 30 is pivotally attached to the piston 16, wherein a reciprocating motion of the piston 16 causes a rotation of the crankshaft 22.

A cylinder head 32 is mounted to the engine block 12 and covers the cylinder bore 14 to define a fuel combustion chamber therein between the top surface 18 of the piston 16 and the cylinder head 32. At least one intake valve 34 and at least one exhaust valve 36 are disposed in the cylinder head 32. The intake valve 34 selectively allows a fuel-air mixture to flow into the combustion chamber. The exhaust valve 36 selectively allows combusted fuel to be exhausted from the combustion chamber. In the illustrated embodiment, the valves 34, 36 are mechanically actuated employing a valve train including an overhead cam shaft 38 and associated lifters 40 and valve springs 41. It should be understood that the valve train can include a single overhead cam or a dual overhead cam, and can be a single cam employing lifters, push rods, rocker arms, and compression springs, for example. It should be understood that solenoid actuated intake valves and exhaust valves can be employed. It should also be understood that other types of cam assemblies now known or later developed can be used. The cylinder head 32 may also include a fuel injector (not shown), wherein air is provided to the combustion chamber through the intake valve 34 and the fuel is directly injected into the combustion chamber through the fuel injector. The surfaces surrounding the combustion chamber such as surfaces of the cylinder bore 14, the top surface 18 of the piston 16, a surface of the cylinder head 32, and surfaces of the valves 34, 36, for example, may be polished or provided with a coating such as chrome or an industrial diamond material to facilitate the reflection of heat energy away from the respective surfaces.

The cylinder head 32 also includes means for initiating the combustion of the fuel within the combustion chamber. Typically, a spark plug 42 having an electrode is provided to initiate the combustion of the fuel. The spark plug 42 is threadably received in the cylinder head 32 to position the electrode within the combustion chamber. The spark plug 42 employs electrical energy from an ignition system (not shown) to create a spark at the electrode to ignite the fuel within the combustion chamber. It should be understood that the engine 10 can be a diesel engine which does not employ a spark plug 42 to initiate the combustion of the fuel.

The combustion of the fuel causes the reciprocating motion of the piston 16, which results in a rotation of the crankshaft 18. It should be understood that additional components are required to construct an operational engine and one skilled in the art is aware of the typical additional components necessary for the general operation of the engine.

It should be understood that selected surfaces of the engine block 12 and the engine components can be provided with coatings to minimize frictional forces between moving components. For example, Teflon®, industrial diamond, or any other suitable coating now known or later developed can be provided on the surface of the engine block 12 forming the cylinder bore 14, the surfaces of the piston 16, and the surfaces of the connecting rod 30, for example. Additionally, it should be understood that a ceramic material can be employed to form at least a portion of the piston 16 or a coating for at least a portion of the piston 16 to minimize a weight thereof.

The engine 10 includes an electromagnetic propulsion system. The electromagnetic propulsion system includes a plurality of permanent magnets 44 such as ceramic magnets and rare earth magnets, for example, and a plurality of electromagnets 46. The permanent magnets 44 and the electromagnets 46 are coupled to and/or embedded in selected engine components such as the engine block 12, the piston 16, the crankshaft 22, the main caps 26, the connecting rod 30, the cylinder head 32, the intake valve 34, the exhaust valve 36, the camshaft 38, a valve cover (not shown), an oil pan (not shown), and the like, for example. The permanent magnets 44 and the electromagnets 46 are arranged to be in motion in respect of one another during the operation of the engine 10. For example, one or more of the permanent magnets 44 can be coupled to the top surface 18 and the skirt 20 of the piston 16 and to an outer periphery, of the throw 24 of the crankshaft 22. Electromagnets 46 can be coupled to and/or embedded in the block 12 and the cylinder head 32, wherein the permanent magnets 44 pass by an area adjacent the electromagnets 46 when the engine 10 is in operation. An electrical current is selectively provided to the electromagnets 46 to produce a desired magnetic field. The produced magnetic field can be adapted to selectively attract and repel the permanent magnets 44 to facilitate the movement of the piston 16 and the crankshaft 22 in respect of the block 12. For example, the electromagnet 46 in the cylinder head 32 can produce a repelling magnetic force in respect of the permanent magnet 44 of the piston 16 each time the piston 16 is at about top dead center, wherein the repelling magnetic force facilitates a downward motion of the piston 16 away from the cylinder head 32. Further, the electromagnet 46 in the cylinder head 32 can produce an attracting magnetic force in respect of the permanent magnet 44 of the piston 16 each time the piston 16 is at about bottom dead center, wherein the attractive magnetic force facilitates an upward motion of the piston 16 toward the cylinder head 32. In the embodiment shown, the attraction and repulsion between the permanent magnets 44 and the electromagnets 46 can provide about three to five pounds of force to facilitate the reciprocating motion to the piston 16, for example. In the illustrated embodiment, the throw 24 is shown generally as a portion of a disk. It should be understood that the throw 24 may be formed as whole disc, wherein the generally disk shaped throw is concentric with a longitudinal axis of the crankshaft 22 to provide an annular array of the permanent magnets 44 around the longitudinal axis of the crankshaft 22. It should be understood that a selected number, as well as a selected magnetic strength, of the permanent magnets 44 and the electromagnets 46 can be employed to produce a desired attraction and/or repulsion force therebetween. The permanent magnets 44 and the electromagnets 46 can be employed with any adjacent internal and/or external engine parts in motion in respect of each other to facilitate the relative motion therebetween. The permanent magnets 44 and the electromagnets 46 can also be employed with transmission and drive train components, and can be employed with accessories for the engine 10 such as a supercharger and a turbocharger, for example. Further, the permanent magnets 44 and the electromagnets 46 can be shaped as a ring and adapted to encircle the cylinder bore 14, the piston 16, and the intake valve 34 and the exhaust valve 36, for example. It should be understood that other shapes can be employed for the permanent magnets 44 and the electromagnets 46 such as a disk, a cylinder, and a sphere, for example.

Electrical energy for the electromagnetic propulsion system can be provided from electrical storage batteries, electrical capacitors, electrical generators, solar collectors, and any other suitable source of electrical energy now known or later discovered.

One of the electromagnets 46 can be formed by providing a winding 48 around the spark plug 42 disposed in the cylinder head 32. An electrical current is selectively provided to the winding 48 to produce a desired magnetic field. It should be understood that the winding 48 can be provided around a separate ferrous material such as a metal sleeve, for example, wherein the spark plug 42 is disposed within the metal sleeve. Further, it should be understood that the electrical current provided to the winding 48 can be subsequently supplied to the spark plug 42 to create the desired spark ignition to the combustion chamber. Additionally, it should be understood that the electromagnets 46 can be provided in the cylinder head 32 that are not associated with the spark plug 42. Such electromagnets can be employed in a diesel engine, for example. The produced magnetic field from the spark plug 42 and the associated winding 48, can be adapted to selectively attract and repel the permanent magnet 44 coupled to and/or embedded in the piston 16 to facilitate the reciprocating motion of the piston 16 within the cylinder bore 14.

The connecting rod 30 can also be magnetized to facilitate the reciprocating motion of the piston 16 within the cylinder bore 14. For example, in a multi-cylinder engine, the polarity of the permanent magnets 44 coupled to and/or embedded in the pistons 16 is oriented to be attracted to the end of the magnetized connecting rods 30 pivotally attached to the pistons 16. The orientation of the polarity of the permanent magnets 44 and the magnetized connecting rods 30 is reversed in adjacent cylinders bores 14. The magnetic field produced by the electromagnets 46 coupled to and/or embedded in the engine block 12 and the cylinder head 32 is adapted to cooperate with the magnetic polarity of each of the pistons 16 and the magnetized connecting rods 30 to facilitate the reciprocating motion of the piston 16 within the cylinder bores 14. By magnetizing the connecting rods 30, a strength thereof may be increased which can provide a reduced mass connecting rod having a strength equivalent to a larger mass connecting rod that is not magnetized.

Figure 2:
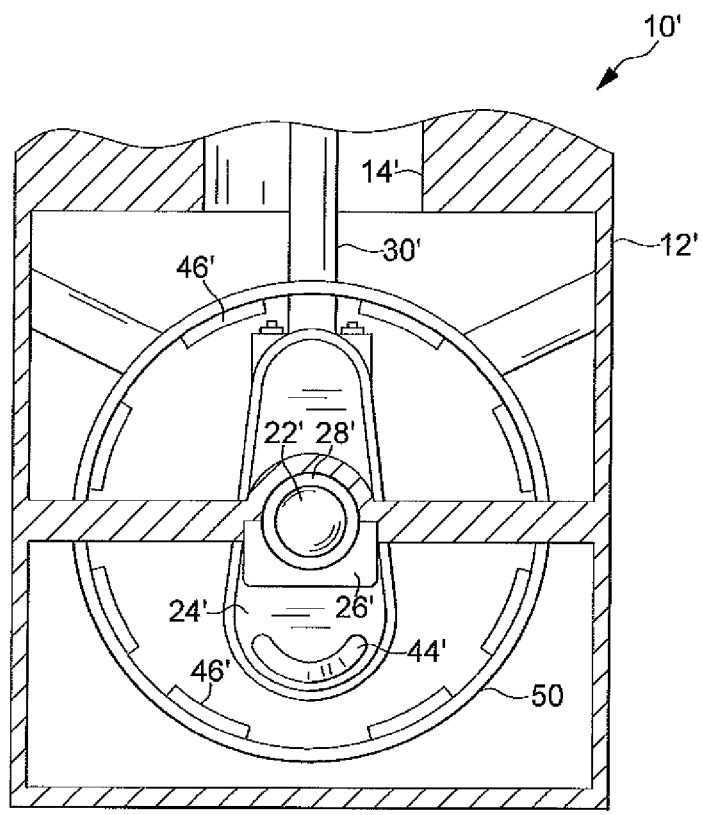
FIG. 2 is a fragmentary cross-sectional side elevational view of the rod and piston type internal combustion engine of FIG. 1 showing a brace coupled to an engine block to support a plurality of electromagnets.

As shown in FIG. 2, a brace 50 can be employed to support the electromagnets 46 and position the electromagnets 46 adjacent permanent magnets 44 coupled to and/or embedded in an associated engine part. Structure similar to that illustrated in FIG. 1 includes the same reference numeral and a prime (T) symbol for clarity. In the illustrated embodiment, the brace 50 is coupled to a block 12' of the engine 10'. It should be understood that the brace 50 can be coupled to other components for the engine 10' such as a main cap '26, an oil pan (not shown), and an engine block reinforcing brace (not shown), for example. The brace 50' surrounds at least a portion of the throw 24' of the crankshaft 22'. The permanent magnets 44' are coupled to and/or embedded in the throw 24' of the crankshaft 22', wherein the permanent magnets 44' pass by an area adjacent the electromagnets 46' of the brace 50 when the crankshaft 22' rotates in respect of the engine block 12'. An electrical current is selectively provided to the electromagnets 46' to produce a desired magnetic field. The produced magnetic field can be adapted to facilitate the rotation of the crankshaft 22' in respect of the engine block 12'. It should be understood that the brace 50 can be formed as a single piece brace. Further, the brace 50 can be adapted to facilitate an addition of the electromagnetic propulsion system to an engine as an aftermarket system. It should be understood that the crankshaft 22' can include a plurality of throws 24', wherein the brace 50 and the associated electromagnets 46' can be provided for each of the throws 24'.

Figure 3:
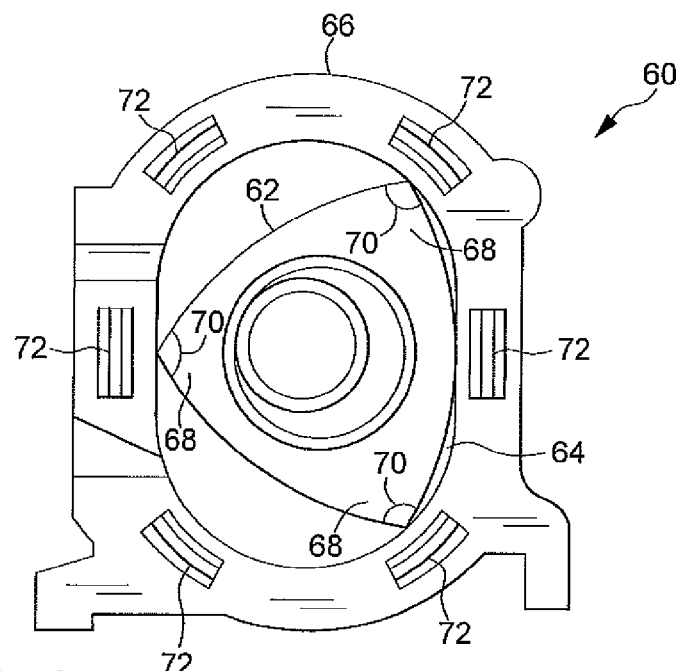
FIG. 3 is a cross-sectional side elevational view of a rotary type engine having an electromagnetic propulsion system.

The electromagnetic propulsion system can also be employed with rotary and radial type engines. In FIG. 3, a Wankle type rotary engine 60 is illustrated showing a rotor 62 rotatably disposed within a combustion chamber 64 of an engine block 66. The rotor 62 has a generally triangular shape having three apex sections 68. Permanent magnets 70 are provided adjacent each of the apex sections 68. An annular array of electromagnets 72 is disposed in the engine block 66 around the periphery of the combustion chamber 64, wherein the permanent magnets 70 pass by an area adjacent the electromagnets 72 when the rotor 62 rotates in respect of the engine block 66.

An electrical current is selectively provided to each of the electromagnets 72 to produce a desired magnetic field. The produced magnetic field can be adapted to selectively attract and repel the permanent magnets 70 in the rotor 62, wherein selectively pulsing the electrical energy to each of the electromagnets 72 facilitates a rotation of the rotor 62 in respect of the engine block 66.

Figure 4:
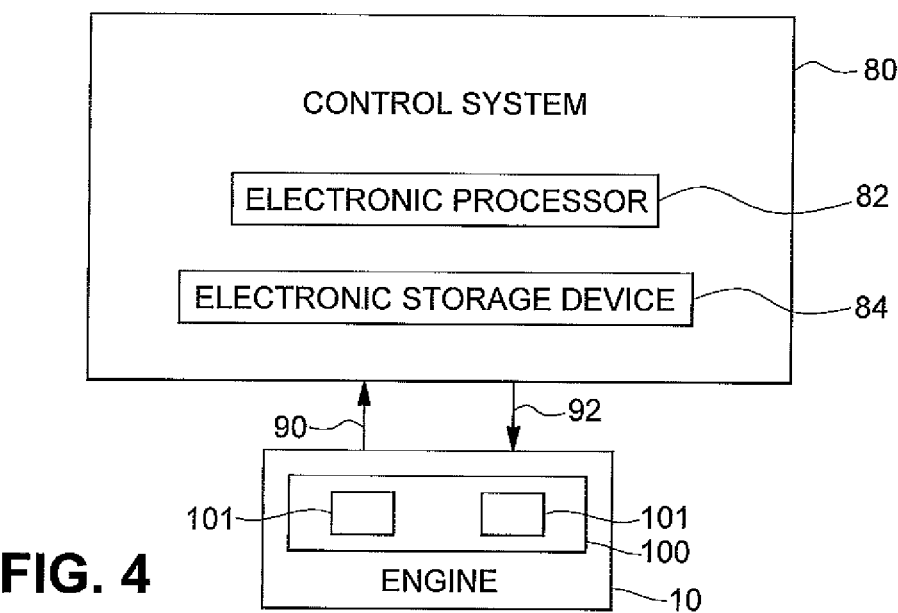
FIG. 4 is a schematic diagram of a control system for use with the rod and piston type engine illustrated in FIGS. 1-2 and the rotary type engine illustrated in FIG. 3.

A control system 80 is provided to control the operation of the engine 10 as shown in FIG. 4. The control system 80 can also be used with the engine 60 and other engine types as desired. Use of the control system 80 is described herein with the engine 10 for exemplary purposes, as it is understood that the control system 80 can be similarly used with the engine 60 and other engine types. The control system is in electrical communication with selected sensors of the engine 10. The control system 80 receives inputs 90 from the sensors such as engine temperature, engine speed (RPM), engine load, vehicle speed, throttle position, crankshaft position, intake valve and exhaust valve position, intake manifold pressure, and exhaust gas properties, for example. A processor 82 is employed having a set of programmable instructions to process the inputs 90 and provide outputs 92 to control operations of the engine 10 such as spark timing, intake valve 34 and exhaust valve 36 position, fuel distribution to the cylinders, and fuel/air ratios, for example. An electronic storage device 84 can be provided and placed in electrical communication with the processor 82 to receive and store data such as the set of programmable instructions, the inputs 90 to and the outputs 92 from the processor 82, for example.

The control system 80 is also effective to control the electromagnetic propulsion system by selectively causing the flow of electrical energy to the electromagnets 46 to produce the desired magnetic field to facilitate the reciprocating motion of the pistons 16 and the rotation of the crankshaft 22. The control system 80 selectively provides an electrical current to each of the electromagnets 46 to produce a desired magnetic field at a desired time for a desired period of time. The produced magnetic field selectively attracts and repels the permanent magnets 44, wherein selectively pulsing the electrical energy to each of the electromagnets 46 facilitates the reciprocating motion of the pistons 16 and the rotation of the crankshaft 22 in respect of the engine block 12.

The electromagnets 46 and the permanent magnets 44 together with the piston 16, connecting rod 30, and crankshaft 22 form an electrical motor adapted to cause a rotation of the crankshaft 18 in respect of the engine block 12. It should be understood that the electrical motor can be employed to start the engine 10; thus, replacing the need for a starter as is typically used with engines. It should be understood that the electrical motor can be constructed separate from the engine 10, wherein the permanent magnets 44 are coupled to a rotatably mounted shaft, an annular array of electromagnets 46 are provided adjacent the shaft, and electrical energy is selectively pulsed to the electromagnets 46 to cause a rotation of the shaft.

It should also be understood that the control system 80 can be adapted to cause the electromagnetic propulsion system to act as an engine braking system and an energy regeneration system. For example, the control system 80 can selectively cause the flow of electrical energy to the electromagnets 46 to produce a magnetic field that cooperates with the magnetic field of the permanent magnets 44 to oppose the reciprocating motion of the pistons 16 and the rotation of the crankshaft 22. Further, during engine coast down periods, for example, the control system 80 can cause an electrical current to be generated as the permanent magnets 44 pass by adjacent electromagnets 46. The electrical current generated can be employed to power electrical components associated with the engine 10 or stored as electrical energy employing electrical capacitors, electrical storage batteries, and the like, for example. Accordingly, it should be understood that the electromagnetic propulsion system can eliminate the need for providing an alternator for the engine 10.

The control system 80 is also adapted to selectively deactivate the cylinder bore 14 upon the detection of selected operating conditions of the engine 10, wherein fuel and spark are not supplied to the cylinder bore 14 to minimize a consumption of fuel by the engine 10. The control system 80 can simultaneously control the flow of electrical energy to the electromagnets 46 to produce the desired magnetic field therearound. It should be understood that the control system 80 can cause the engine 10 to operate by a burning of the fuel in the cylinder bore 14, by the electromagnetic propulsion system, and a combination thereof. For example, the cylinder bore 14 can be deactivated in respect of fuel during periods when the engine 10 is idling, periods where minimal power output is required, or other periods where the consumption of fuel can be minimized, for example. The electromagnetic propulsion system maintains the reciprocating motion of the piston 16 and the rotation of the crankshaft 22 when fuel is not being supplied to the cylinder bore 14. It should also be understood that by employing the electromagnetic propulsion system while burning the fuel in the cylinder bore 14, the quantity of $NO_x$ contained in exhaust from the cylinder bore 14 is minimized.

In use, the engine 10 is generally operated as is know to those skilled in the art of internal combustion engines. A fuel-air mixture is provided to the combustion chamber of the cylinder bore 14. An ignition spark is provided from the spark plug 42 to initiate the burning of the fuel within the combustion chamber. Energy from the burning of the fuel causes a reciprocating movement of the piston 16 within the cylinder bore 14 and a rotation of the crankshaft 22. The rotation of the crankshaft 22 is employed to mechanically power selected engine components such as an alternator, a fluid compressor, or a fluid pump, for example, as well as provide a motive force to propel the associated vehicle or the associated device such as an electric generator or a fluid pump, for example. The electromagnetic propulsion system, together with the control system 80, selectively provides cooperating magnetic forces between engine components in relative motion with respect to each other to facilitate the reciprocating motion of the pistons 16 and the rotation of the crankshaft 22 and minimize the quantity of fuel being burned in the cylinder bores 14.

Figure 5:
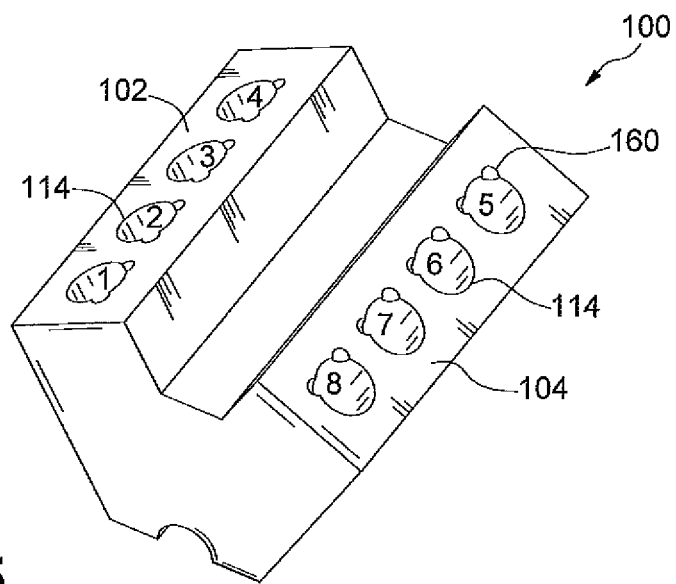
FIG. 5 is a perspective view of an engine block according to an embodiment of the invention.
Figure 6:
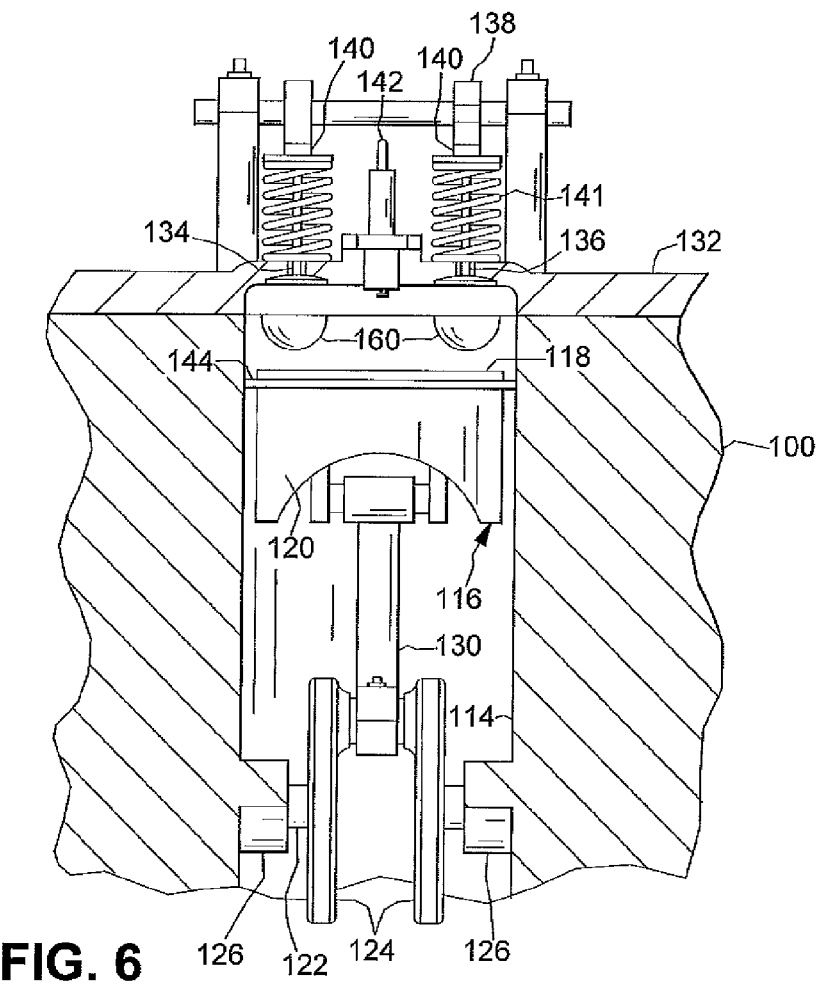
FIG. 6 is a fragmentary cross-sectional side elevational view of a piston disposed within a cylinder bore of the engine block illustrated in FIG. 5.

Referring to FIGS. 5-6, there is shown an engine block 100 for a V-style internal combustion engine. The engine block 100 maximizes a fuel efficiency of the internal combustion engine. The engine block 100 is a V-style engine block having two cylinder banks 102, 104. Each of the cylinder banks 102, 104 includes four cylinder bores 114 to provide a total of eight cylinder bores 114 in the engine block 100 (the cylinder bores 114 labeled 1 through 8). The illustrated engine block 100 is used to construct a V8 internal combustion engine. It should be understood that the engine block 100 can have additional or fewer cylinder bores 114 to form a single cylinder engine or a multiple cylinder engine in a V, an inline, and an opposing cylinder bore configuration, for example. Additionally, it should be understood that the engine can be a four cycle or a two cycle engine, and can be based on the Otto cycle, Miller cycle, Scuderi split-cycle, or any other engine cycle now know or later developed.

As shown in FIG. 6, the cylinder bores 114 reciprocatingly receive a piston 116 therein. The pistons 116 include a top surface 118 and a skirt 120 depending therefrom. A crankshaft 122 having at least one throw 124 is rotatably mounted to a lower end of the engine block 100 employing a plurality of main caps 126 and associated main bearings (not shown). A connecting rod 130 is provided to connect the piston 116 to the crankshaft 122. One end of the connecting rod 130 is rotatably mounted to the crankshaft 122. An opposite end of the connecting rod 130 is pivotally attached to the piston 116, wherein a reciprocating motion of the piston 116 causes a rotation of the crankshaft 122.

A cylinder head 132 is mounted to each of the cylinder banks 102, 104 of the engine block 100 and covers the cylinder bores 114 to define a fuel combustion chamber therein between the top surface 118 of the pistons 116 and the cylinder heads 132. At least one intake valve 134 and at least one exhaust valve 136 are reciprocatively disposed in the cylinder head 132 for each of the cylinder bores 114. The intake valve 134 selectively allows a fuel-air mixture to flow into the combustion chamber and the exhaust valve 136 selectively allows combusted fuel to be exhausted from the combustion chamber. In the illustrated embodiment, the valves 134, 136 are mechanically actuated employing a valve train including an overhead cam shaft 138 and associated lifters 140 and valve springs 141. It should be understood that the valve train can include a single overhead cam or a dual overhead cam and can be a single cam employing lifters, push rods, rocker arms, and compression springs, for example. It should be understood that solenoid actuated intake valves and exhaust valves can be employed. It should also be understood that other types of cam assemblies now known or later developed can be used. The cylinder heads 132 may also include a fuel injector (not shown), wherein air is provided to the combustion chamber through the intake valve 134 and the fuel is directly injected into the combustion chamber through the fuel injector. The surfaces surrounding the combustion chamber such as surfaces forming the cylinder bores 114, the top surface 118 of the pistons 116, a surface of the cylinder heads 132, and surfaces of the intake valve 134 and the exhaust valve 136, for example, may be polished or include a coating of an industrial diamond to facilitate the reflection of heat energy away from the respective surfaces.

The cylinder heads 132 also include means for initiating the combustion of the fuel within the combustion chamber. Typically, a plurality of spark plugs 142 having an electrode is provided to initiate the combustion of the fuel. The spark plugs 142 are threadably received in the cylinder head 132 to position the electrode within the combustion chamber. The spark plugs 142 employ electrical energy from an ignition system (not shown) to create a spark at the electrode to ignite the fuel within the respective combustion chambers. It should be understood that the engine block 100 can be used with a diesel engine which does not employ the spark plugs 142 to initiate the combustion of the fuel.

At least one chamfer 160 is formed in the engine block 100 adjacent at least a portion of an upper edge of the cylinder bores 114. As shown in FIGS. 5-6, two of the chamfers 160 are provided for each of the cylinder bores 114, one chamfer 160 adjacent the intake valve 134 and the second chamfer 160 adjacent the exhaust valve 136. The chamfers 160 extend downwardly from the upper edge of the cylinder bores 114 a selected distance to a lower edge of the chamfers 160. As shown in FIG. 6, a piston ring 144 is disposed on each of the pistons 116. The piston ring 144 is positioned below the lower edge of the chamfer 160 when the pistons 116 are at an uppermost reciprocating position (top dead center position) within the cylinder bores 114. It should be understood that a single chamfer 160 can be formed in each of the cylinder bores 114 such as a single chamfer 160 formed adjacent the intake valve 132, for example. It should also be understood that more than two chamfers 160 can be formed in each of the cylinder bores 114 such as four chamfers 160, wherein one chamfer is provided for each valve in a four valve cylinder head, for example.

The chamfers 160 cause a turbulent flow of the fuel air mixture into the cylinder bores 160, which maximizes the efficient ignition and burning of the fuel within the combustion chambers. The maximized ignition and burning of the fuel enables the ignition spark to be provided to the cylinder bores 114 when the pistons 116 are at about an uppermost reciprocating position (top dead center). The chamfers 160 also facilitate a flow of the combusted fuel-air mixture out of the cylinder bores 160.

The control system 80 described hereinabove in respect of FIG. 4 may also be used with an engine employing the engine block 100. The control system 80 is effective to selectively deactivate and reactivate any of the cylinder bores 114 in any desired sequence. As a non-limiting example, a plurality of temperature sensors 101 can be provided at selected locations of the engine block 100. The control system may selectively activate and deactivate the cylinder bores 114 to maintain a required power output of the engine, while minimizing temperature differences in the engine block 100. Additionally, selective deactivation and activation of all of the cylinder bores 114 facilitates maintaining desired lubrication of each of the cylinder bores 114 and associated components, and minimizes an accumulation of carbon deposits in each of the cylinder bores 114 and on associated components such as the intake valves 134 and the exhaust valves 136, for example. The control system 80 may cause the internal combustion engine formed from the engine block 100 to operate as a two, three, four, or eight cylinder engine, for example. The following cylinder firing orders may be employed to operate a 4-cycle internal combustion engine: 1-3-7-2-6-5-4-8 (8-cylinder mode), 1-7-6-4 followed by 3-2-5-8 (4-cylinder mode), 1-2-4 followed by 3-6-8 followed by 7-5 (3-cylinder mode), 1-6 followed by 3-5 followed by 7-4 followed by 2-8 (2-cylinder mode), for example. It should be understood that the control system 80 can be employed to create any desired firing order and can be used with other engine block types to selectively deactivate and reactivate the cylinder bores 114.

The control system 80 deactivates the cylinder bores 114 by stopping a flow of fuel thereto and stopping the flow of electrical energy to the spark plugs for the respective cylinder bores 114. It should be understood that the control system 80 may also stop the flow of air into the cylinder bores 114. The flow of fuel and air into the cylinder bores 114 may be stopped by selectively controlling a fuel/air intake system, a solenoid intake valve, or by causing an opening and closing of the intake valves 134 to cease.

A water jacket (not shown) as is commonly known in the art is formed within the engine block 100 adjacent each of the cylinder bores 114 to facilitate transferring heat energy away from the area of the cylinder bores 114. Enabling the cylinder bores 114 to be selectively deactivated can result in lower engine operating temperatures as compared to engines not employing cylinder bore deactivation. Accordingly, the water jacket can have a reduced water volume as compared to water jackets provided for engines not employing cylinder bore deactivation. The reduced water volume of the water jacket maximizes a strength of the walls forming the cylinder bores 114 and generally provides for maximized rigidity of the engine block 100.

Further, the control system 80 may be adapted to control the timing of the spark in respect of a position of the pistons 116 within the cylinder bores 114. It should be understood that the control system 80 is adapted to change the timing of the spark based upon the detected engine operating conditions. For example, the timing of the spark to the combustion chamber can be provided when the pistons 116 are at an uppermost position within the cylinder bores 114, typically called a top dead center position.

As a non-limiting example, four magnetic members may be disposed in a substantially evenly spaced annular configuration around a rotating harmonic balancer of a V8 engine. A magnetic pick-up is provided adjacent the harmonic balancer to sense the magnetic members of the harmonic balancer passing by the magnetic pick-up. The magnetic pick-up is in electrical communication with the control system 80 and provides a signal to the control system 80 each time one of the magnetic members passes thereby. The signal is employed by the control system 80 to control the timing of the spark in the combustion chambers.

It should be understood that the electromagnetic propulsion system including the permanent magnets 44 and the electromagnets 46 described hereinabove and shown in FIGS. 1-3 can be employed with the engine formed from the engine block 100. The control system 80 can be employed to cause the engine formed from the engine block 100 to operate by burning fuel in the cylinder bores 114, by the electromagnetic propulsion system, and a combination thereof. For example, the cylinder bores 114 can be deactivated in respect of fuel during periods when the engine is idling, periods where minimal power output is required, or other periods where the consumption of fuel can be minimized, for example. The electromagnetic propulsion system maintains the reciprocating motion of the piston 116 and the rotation of the crankshaft 122 when fuel is not being supplied to and burned within the cylinder bores 114. Additionally, the electromagnetic propulsion system can be employed while fuel is being supplied to and burned within the cylinder bores 114, wherein the electromagnetic propulsion system facilitates maintaining a desired power output from the engine while minimizing the fuel required to maintain the desired power output.

Figure 7:
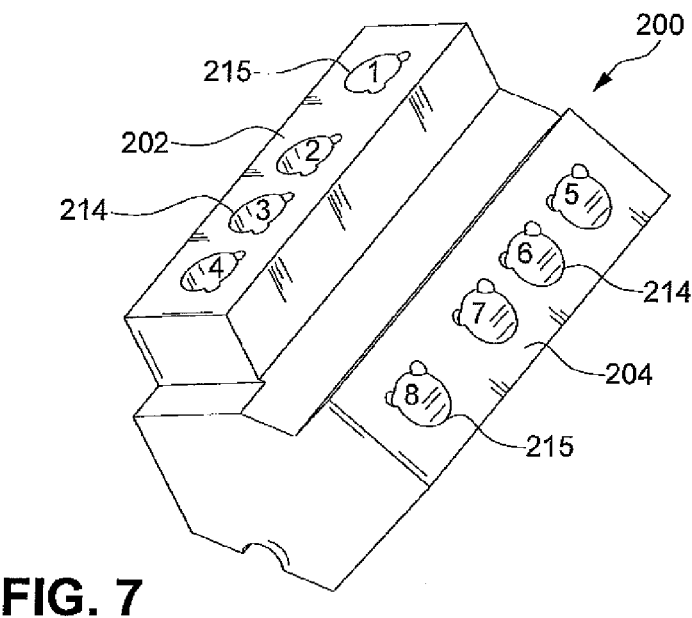
FIG. 7 is a perspective view of an engine block according to another embodiment of the invention.

FIG. 7 illustrates an alternative embodiment of the engine block 100 shown in FIG. 5. In FIG. 7, there is shown an engine block 200 for a V-style internal combustion engine having two cylinder banks 202, 204. Each of the cylinder banks 202, 204 includes four cylinder bores 214 to provide a total of eight cylinder bores 214 in the engine block 200 (the cylinder bores 214 labeled 1 through 8). The illustrated engine block 200 is used to construct a V8 internal combustion engine. It should be understood that the engine block 200 can have additional or fewer cylinder bores 214 to form a single cylinder engine or a multiple cylinder engine in a V, an inline, and an opposing cylinder bore configuration, for example. Additionally, it should be understood that the engine can be a four cycle or a two cycle engine, and can be based on the Otto cycle, Miller cycle, Scuderi split-cycle, or any other engine cycle now know or later developed.

One of the cylinder bores 214 in each of the cylinder banks 202, 206 is an offset cylinder bore 215, wherein each of the offset cylinder bores 215 have a greater distance between the offset cylinder bore 215 and an adjacent cylinder bore 214 as compared to the distance between the other cylinder bores 214 in the cylinder banks 202, 204. The offset cylinder bores 215 are located at an end of the cylinder banks 202, 204, wherein the offset cylinder bores 215 are formed at opposite ends of the respective cylinder banks 202, 204. It should be understood that a cylinder head (not shown), a crankshaft (not shown), and other engine components (not shown) are adapted to accommodate the offset cylinder bores 215. The offset cylinder bores 215 facilitate an operation of the engine with only the offset cylinder bores 215 activated, wherein the supplying and burning of fuel in the remaining cylinder bores 214 is deactivated. Having the greater distance between the offset cylinder bores 215 and the adjacent cylinder bores 214 minimizes a transfer of heat energy between the offset cylinder bores 215 and the adjacent cylinder bores 214. Further, the minimized transfer of heat energy between the offset cylinder bores 215 and the adjacent cylinder bores 214 facilitate minimizing thermal differences between the other cylinder bores 214 in the cylinder banks 202, 204 when only the offset cylinder bores 215 are activated. During periods when only the offset cylinder bores 215 are activated, the minimized thermal differences between the non-offset cylinder bores 214 maximizes an efficient and smooth operation of the engine upon the re-activation of the non-offset cylinder bores 214. The remaining structure and function of the engine block 200 and associated engine components are substantially the same as described herein above for the engine block 100.

As is well known in the art of internal combustion engines, various additional components must be assembled to the engine blocks 12, 100, 200 to construct an operational engine.

Figure 8:
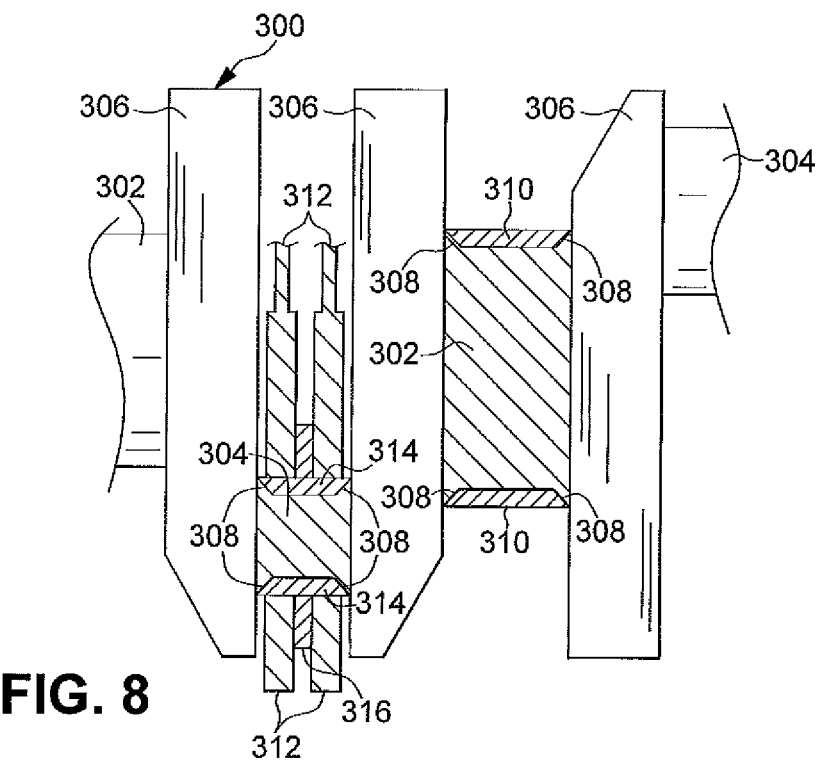
FIG. 8 is a fragmentary side elevational view partially in section of a crankshaft with bearings disposed around a main journal and a rod journal of the crankshaft.

Referring now to FIG. 8, a portion of a crankshaft 300 is shown. The crankshaft 300 includes a plurality of main journals 302 and a plurality of connecting rod journals 304. A throw 306 is interposed between adjacent main journals 302 and connecting rod journals 304. The main journals 302 and the connecting rod journals 304 include spaced apart beveled edges 308.

As is well known in the art, the crank shaft 300 is rotatably mounted to a lower end of an engine block (not shown) employing a plurality of main bearings 310 and a plurality of main caps (not shown), wherein the main bearings 310 and the main caps are received by the main journals 302. The main bearings 310 are generally ring shaped, wherein two substantially c-shaped members are joined together around the main journals 302 to facilitate the rotation movement of the crank 300 in respect of the engine block. The main bearings 310 are tapered bearings having a cross sectional area in the general shape of an isosceles trapezoid.

A plurality of connecting rods 312 is provided to connect pistons (not shown) to the connecting rod journals 304 of the crankshaft 300. One end of the connecting rods 312 is rotatably mounted to the connecting rod journals 304 of the crankshaft 300. Connecting rod bearings 314 are disposed between the end of the connecting rods 312 and the connecting rod journals 304. The connecting rod bearings 314 are generally ring shaped, wherein two substantially c-shaped members are joined together around the connecting rod journals 304 to facilitate the relative movement between the connecting rods 312 and the crankshaft 300. The connecting rod bearings 314 are tapered bearings having a cross sectional area in the general shape of an isosceles trapezoid. The connecting rods 312 extend into cylinder bores (not shown) of an engine block and an opposite end of the connecting rods 312 is pivotally attached to the pistons, wherein a reciprocating motion of the pistons causes a rotation of the crankshaft 300.

The beveled edges 308 of the journals 302, 304 abut the tapered sides of the bearings 310, 314. The shorter of the parallel sides of the bearings 310, 314 forms an inner surface thereof which abuts a surface of the respective journals 302, 304. The beveled edges 308 and tapered sides of the bearings 310, 314 cooperate to minimize an axial movement of the crankshaft 300 in respect of the engine block and the axial movement of the connecting rods 312 in respect of the crankshaft 300.

Figure 9:
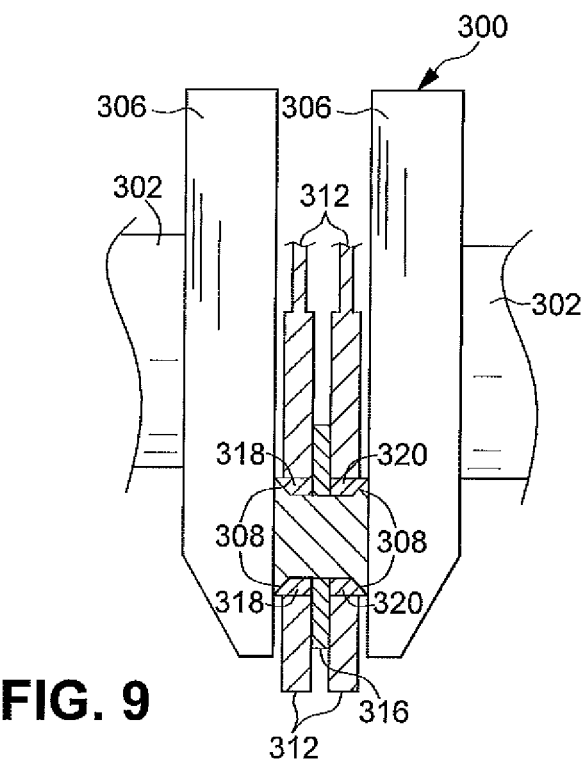
FIG. 9 is a fragmentary side elevational view partially in section of a crankshaft with a pair of bearings disposed around a rod journal of the crankshaft according to another embodiment of the invention.

Each of the connecting rod journals 304 receives a pair of the connecting rods 312. A spacer 316 may be provided between the connecting rods 312 to minimize a friction therebetween, for example. The spacer 316 has a general shape of a washer, wherein two substantially c-shaped members are joined together around the connecting rod journal 304 to form the general washer shape of the spacer 316. Further, as shown in FIG. 9, separate connecting rod bearings 318, 320 can be provided for each of the connecting rods 312 received by the connecting rod journals 304, wherein the spacer 316 is disposed between the bearings 318, 320 and extends between the connecting rods 316. It should be understood that the main bearings 310, the connecting rod bearings 314, 318, 320, and the spacers 316 can be provided with coatings to minimize frictional forces between moving components. For example, Teflon®, industrial diamond, or any other suitable coating now known or later developed can be provided, for example.

Figure 10:
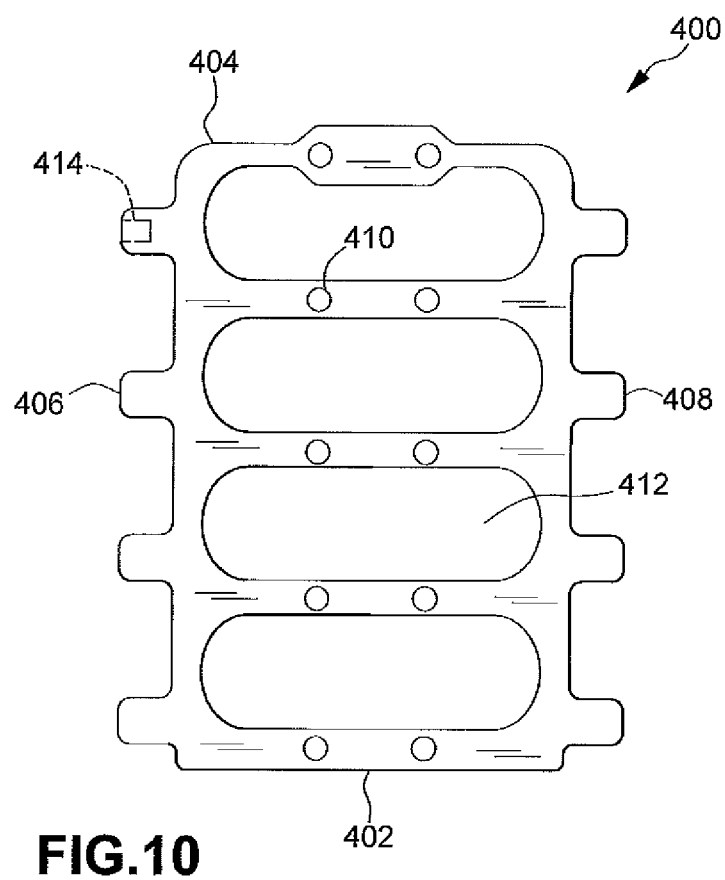
FIG. 10 is a top plan view of a brace for a lower end of an engine block.
Figure 11:
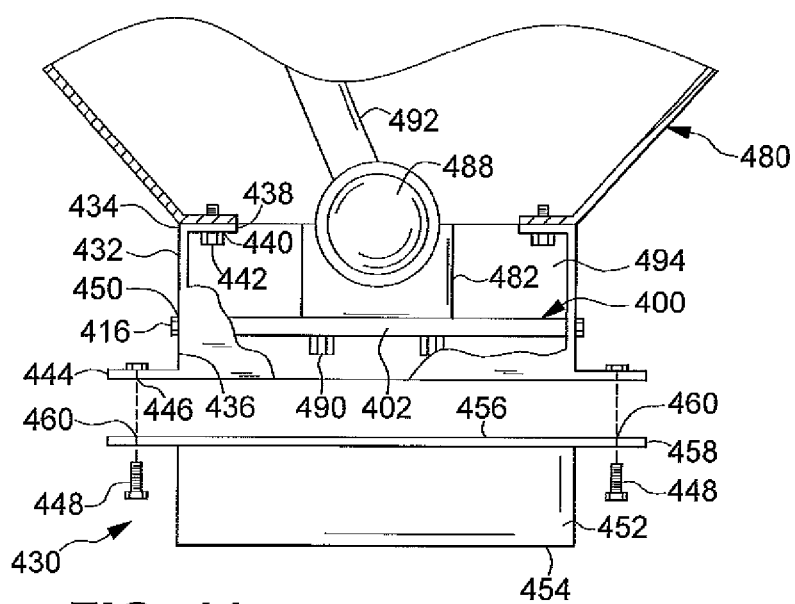
FIG. 11 is a fragmentary end elevational view of an engine block showing a partially exploded assembly of the brace illustrated in FIG. 10 and an associated oil pan, the oil pan having portions of an outer surface thereof cut away.
Figure 12:
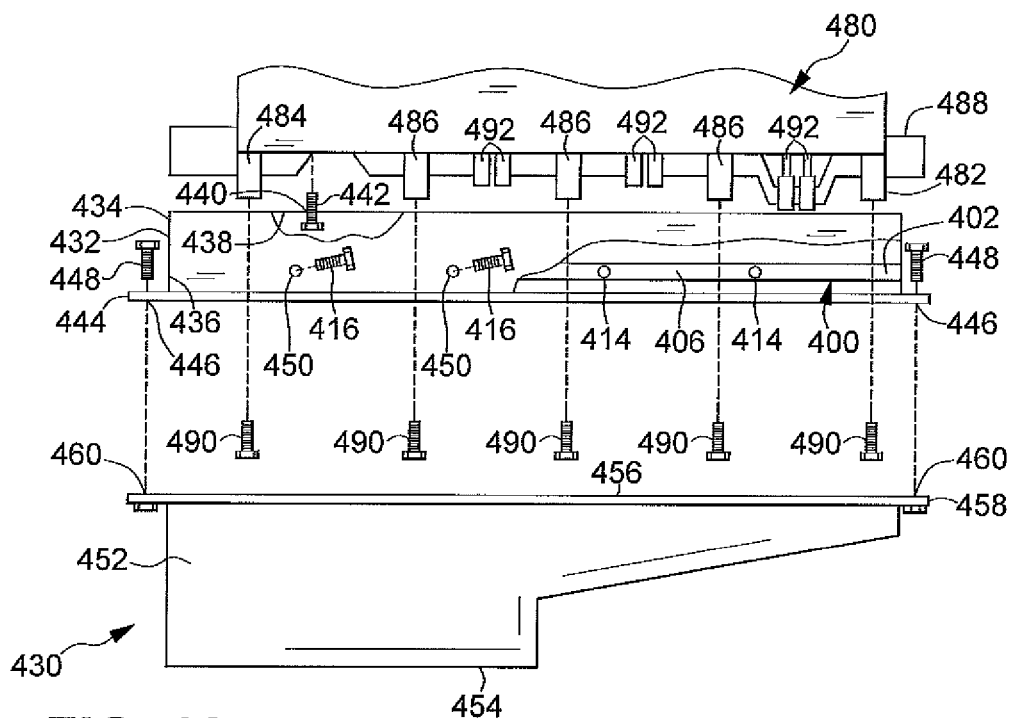
FIG. 12 is a fragmentary side elevational view of the assembly of the brace and the oil pan illustrated in FIG. 11.

Referring now to FIGS. 10-12, a brace 400 is shown that cooperates with an oil pan 430 to maximize the rigidity of an engine block 480 and minimize a deformation of the engine block 480 during an operation of an engine formed therewith. The brace 400 supports a fore main cap 482, an aft main cap 484, and one or more intermediate main caps 486. The main caps 482, 484, 486 rotatably support a crankshaft 488. Threaded fasteners 490 are typically employed to attach the main caps 482, 484, 486 to a lower end of the engine block 480. In the illustrated embodiment, five main caps 482, 484, 486 are employed to rotatably support the crankshaft 488. It should be understood that the brace 400 can be employed with engines having fewer or additional main caps 482, 484, 486. For example, the brace 400 can be employed with an engine having six main caps such as a V-10 engine or an engine having four main caps such as a V-6 engine. A plurality of connecting rods 490 is rotatably mounted to the crankshaft 488, each of which extend upwardly into a cylinder bore (not shown). The oil pan 450 defines a crankcase area 492 between an inner surface of the oil pan 450 and the lower end of the engine block 480.

The brace 400 is a generally planar member having spaced apart ends 402, 404 extending from the fore main cap 482 to the aft main cap 484, and spaced apart sides 406, 408 extending from one side to an opposites side of the oil pan 450. A plurality of apertures 410 is formed in a central portion of the brace 400 adapted to receive the threaded fasteners 490 employed to attach the main caps 482, 484, 486 to the engine block 480. The fasteners 490 secure the brace 480 to the lowermost portion of the main caps 482, 484, 486 and secure the main caps 482, 484, 486 to the engine block 480. A plurality of openings 412 is formed in the brace 400 to facilitate a liquid such as a lubricating oil, for example, passing therethrough. A plurality of threaded bores 414 is formed in the sides 406, 408 of the brace 400 to receive a threaded fastener 416 as shown in FIGS. 11-12. It should be understood that the brace 400 can include reinforcing features such as a plurality of ribs formed therein or reinforcement members attached thereto.

The oil pan 430 includes a skirt member 432 and a pan member 452. The skirt member 432 includes an upper edge 434 and a spaced apart lower edge 436. An upper flange 438 is formed adjacent the upper edge 434 which extends laterally outwardly from an inner surface of the skirt member 432. It should be understood that the upper flange 458 can be formed to extend laterally outwardly from an outer surface of the skirt member 432. The upper flange 438 includes a plurality of apertures 440 formed therein adapted to receive a threaded fastener 442 to secure the skirt member 432 to the lower portion of the engine block 480. It should be understood that a seal member such as a liquid sealant, an o-ring, and a flat gasket, for example, can be disposed between the upper flange 438 of the skirt member 432 and the engine block 480 to facilitate forming a substantially fluid tight seal therebetween. A lower flange 444 is formed adjacent the lower edge 436 of the skirt member 432 which extends laterally outwardly from an outer surface of the skirt member 432. The lower flange 444 includes a plurality of apertures 446, each of which is adapted to receive a threaded fastener 448. A plurality of apertures 450 is formed in the skirt member 452, wherein the apertures 450 are in substantial alignment with a plane adjacent the lowermost surface of the main caps 482, 484, 486. The threaded fasteners 416 extend through the apertures 450 and are received in the threaded bores 414 of the brace 400 to couple the brace 400 to the skirt member 432. It should be understood that one or more shims may be disposed between the main caps 482, 484, 486 and the brace 400 and/or the lower end of the engine block 480 and the skirt member 432 to facilitate an alignment of the apertures 450 in the skirt member 432 with the threaded bores 414 of the brace 400. It should be understood that the brace 400 can be formed having a substantially straight ends 402, 404 and straight sides 406, 408, wherein the periphery of the brace 400 abuts an inner surface of the skirt member 432. Further, it should be understood that one or more seal members such as a liquid sealant, an O-ring, and a flat gasket, for example, can be disposed between the skirt member 432 and ends 402, 404 and the sides 406, 408 of the brace 400 to facilitate forming a substantially fluid tight seal therebetween.

The pan member 452 of the oil pan 430 includes a closed bottom 454 and an open upper end 456 having a pan flange 458 formed adjacent thereto. The pan flange 458 extends outwardly from an outer surface of the pan member 452 and includes a plurality of apertures 460 formed therein. The apertures 460 of the pan flange 458 are adapted to be in substantial alignment with the apertures 446 formed in the lower flange 444 of the skirt member 432. The threaded fastener 448 is employed to join together the skirt member 432 and the pan member 452 and form a substantially fluid tight seal therebetween. It should be understood one or more seal members such as a liquid sealant, an O-ring, and a flat gasket, for example, can be disposed between the lower flange 444 of the skirt member 432 and the pan flange 458 of the pan member 452 to facilitate forming the substantially fluid tight seal therebetween. A drain plug (not shown) can be provided in the closed bottom 454 of the pan member 452 to facilitate draining a fluid therefrom.

It should be understood that the brace 400, the skirt member 432, and the pan member 452 can be adapted for the ends 402, 404 and/or the sides 406, 408 of the brace 400 to be disposed between the lower flange 444 of the skirt member 432 and the pan flange 458 of the pan member 452. Additionally, the brace 400 can have other constructions such as a curvilinear construction wherein the sides 406, 408 abut the lower end of the engine block 480, thus eliminating the need for the skirt member 432. Further, the brace 400 and the apertures 450 of the skirt member 432 can be adapted to position the sides 406, 408 of the brace 400 on a plane different from the plane of the lowermost surfaces of the main caps 482, 484, 486.

The maximized rigidity and minimized distortion of the engine block 480 provided by the brace allows for minimized clearances between mating internal engine components. It has been found that clearances of about 0.0002 inches can be employed as a result of minimizing distortion of the engine block 480 during the operation of the engine.

The brace 400 can include one or more scraping members (not shown) extending therefrom to a location adjacent the crankshaft 488 and/or the connecting rods 492. The scraping members are adapted to remove lubricating fluid deposited on selected surfaces of the crankshaft 488 and/or the connecting rods 492 as the crankshaft 488 rotates and/or the connecting rods 492 reciprocate. Further, the scraping members can be formed separate from the brace 400 and disposed within the crankcase area 490 adjacent the crankshaft 488 and/or the connecting rods 492. By removing lubricating fluid from the outer surfaces of the crankshaft 488 and the connecting rods 492, the operating mass thereof is reduced which reduces the energy required to accelerate or maintain the rotational velocity of the crankshaft 488 and the connecting rods 492, and increases a fuel efficiency of the engine.

It should be understood that a valley brace (not shown) can also be provided for an upper end of the engine block 480 to maximize the rigidity of the engine block 480 and minimize a deformation thereof during the operation of the engine. An exemplary brace for the upper end of the engine block 480 is disclosed in commonly owned U.S. Pat. No. 7,258,094, hereby incorporated herein by reference in its entirety.

Figure 13:
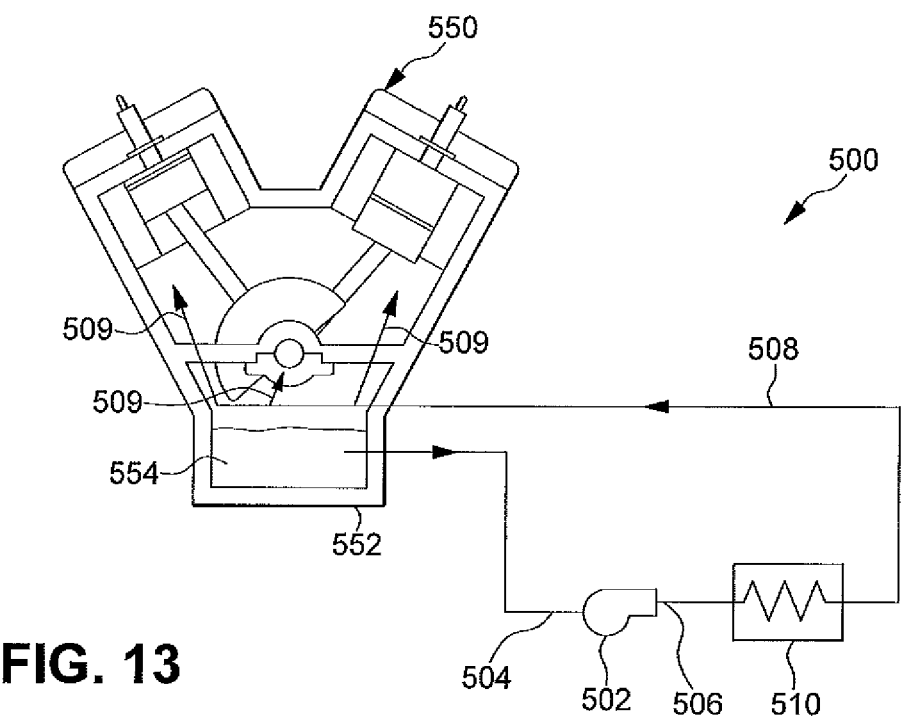
FIG. 13 is a schematic diagram of a lubrication system for directing a fluid to selected locations within an internal combustion engine.

FIG. 13 is a schematic representation of a lubrication system 500 for an engine 550. The lubrication system 500 directs a lubricating fluid 554 such as an oil, for example, to moving components of the engine 550. The lubrication system 500 includes a fluid pump 502. The fluid pump 502 can be mechanically driven by the engine 550, driven by an electrical motor, or driven by other means as desired. The fluid pump 502 includes a suction port 504 and a discharge port 506. The suction port 504 is in fluid communication with the lubricating fluid 554 disposed in an oil pan 552 of the engine 550. The discharge port 506 is in fluid communication with a network of fluid conduits 508, wherein the conduits 508 terminate at a discharge end 509 positioned adjacent a selected location within the engine 550. For example, the network of fluid conduits 508 and discharge ends 509 thereof can direct the fluid 554 to main caps, surfaces forming cylinder bores of the engine 550, and to other locations of the engine 550 and associated engine components, for example. The lubrication system 500 can include a cooler 510, wherein the fluid 554 is caused to pass therethrough to remove heat energy from the fluid 554 prior to being distributed through the network of fluid conduits 508. It should be understood that the cooler 510 can be a fin type radiator cooler adapted to transfer heat energy to the atmosphere or other types of coolers. It should also be understood that the cooler 510 can be employed to transfer heat energy to the fluid 554 or a separate heating element can be provided for the lubrication system 500 to facilitate maintaining the fluid 554 at or above a minimum selected temperature. The fluid capacity of the lubrication system 500 can be ten (10) quarts or more of the fluid 554 to facilitate cooling the fluid 554 to a selected temperature while maintaining an adequate supply of the fluid 554 to the engine 550. It should be understood that the engine 550 can include a plurality of cooperating fluid passageways (not shown) such as passageways formed in an engine block, for example, wherein the fluid passageways are in fluid communication with the discharge port 506 of the pump 502, to facilitate distributing the fluid 554 to selected locations within the engine 550. The lubrication system 500 provides an oil pressure of about 2 psi, which is lower than oil pressures typically employed for internal combustion engines. Employing the lubrication system 500 together with the reduced engine component clearances of 0.0002 (as discussed hereinabove in respect of the brace 400) facilitates the use of the lower oil pressure of about at least 2 psi. The lower oil pressure has been found to cause the lubricating oil to be received within the reduced clearances between engine components and provide lubrication to facilitate relative motion between engine components. It should be understood that the lubrication system 500 can provide higher oil pressures as desired.

Figure 14:
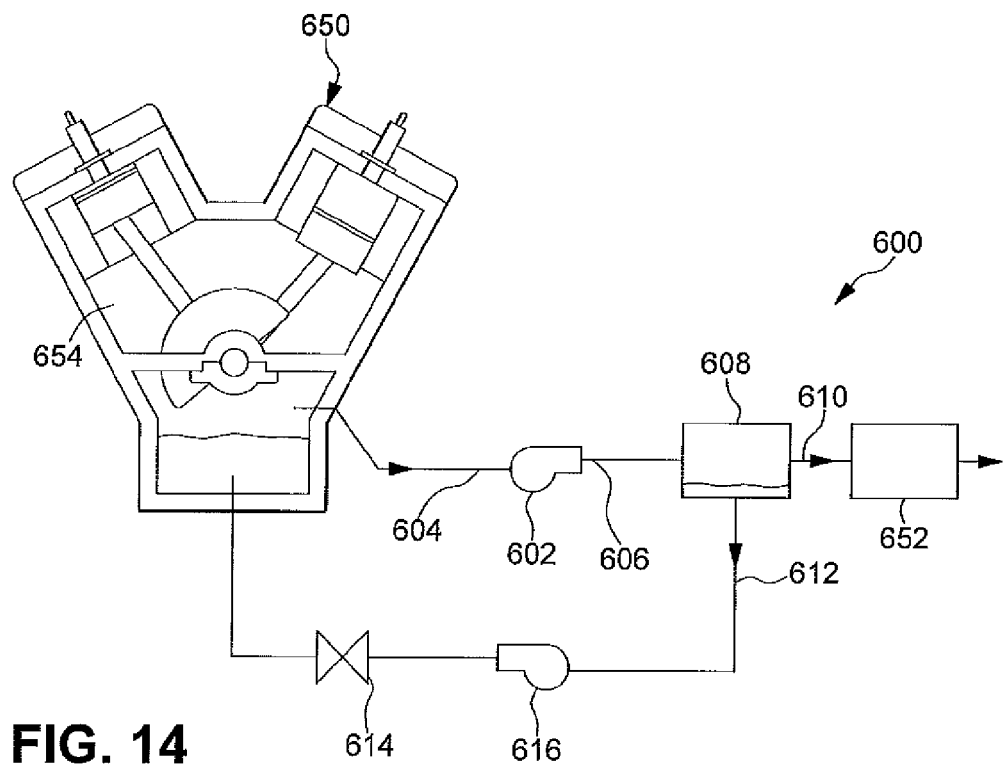
FIG. 14 is a schematic diagram of a crankcase vacuum system for evacuating air from a crankcase of an internal combustion engine.

A schematic representation of a crankcase vacuum system 600 for an engine 650 is illustrated in FIG. 14. The crankcase vacuum system 600 includes a vacuum pump 602. The vacuum pump 602 can be mechanically driven by the engine 650 utilizing pulleys and a power transmission belt, driven by an electrical motor, or driven by other means as desired. The vacuum pump 602 includes a suction port 604 and a discharge port 606. The suction port 604 is in fluid communication with an internal crankcase area 654 of the engine 650 and the discharge port 606 is in fluid communication with a fluid recovery canister 608. The vacuum pump 602 evacuates air from the crankcase area 654 within the engine 650 to create an air pressure therein that is less than atmospheric pressure. Favorable results have been obtained by achieving a vacuum reading of about 13 inches of mercury (HG) within the crankcase area. The reduced pressure within the crankcase area 654 reduces an aerodynamic resistance to the rotation of a crankshaft and the reciprocating motion of connecting rods and pistons of the engine 650.

The discharge port 606 of the vacuum pump 600 can be placed in fluid communication with the fluid recovery canister 608. The canister 608 is adapted to substantially remove lubricating fluid entrained in the air being drawn from the crankcase area 654. The canister 608 facilitates collecting the lubricating fluid therein and exhausting air therefrom. The air can be exhausted from the canister 608 through an air exhaust conduit 610. The air can be exhausted to an exhaust system 652 of the engine 650 and discharged to the atmosphere. For example, the air can be exhausted to a catalytic converter or other component of the exhaust system 652. The exhaust system 652 is effective to collect and/or combust oil or other hydrocarbons entrained in the air and minimize emissions of hydrocarbons to the atmosphere from through the vacuum system 600. Lubricating fluid collected in the canister 608 can be reintroduced to the crankcase area 654 through a fluid recovery conduit 612. A valve 614 such as a check valve or an actuated valve, for example, can be provided in to control the flow of the lubricating fluid through the fluid recovery conduit 612 and militate against air being drawn into the crankcase area through the fluid recovery conduit 612. Additionally, a fluid recovery pump 616 can be provided to propel lubricating fluid from the canister 608 to the crankcase area 654 of the engine 650.

Figure 15:
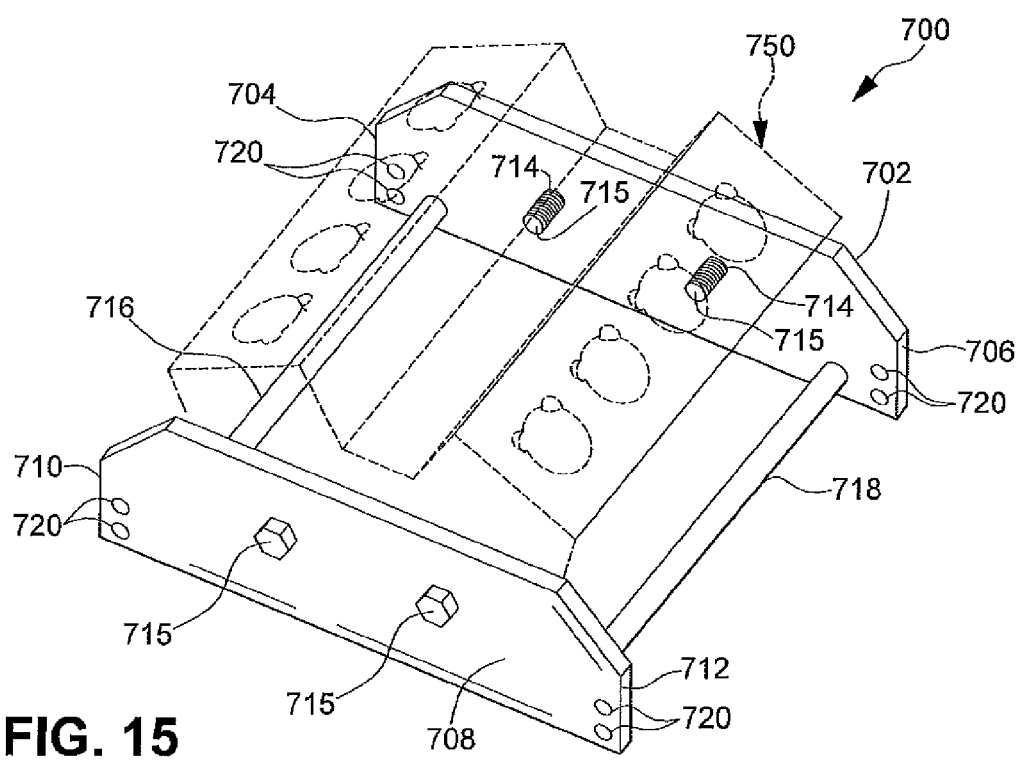
FIG. 15 is a top perspective view of an engine block mounting system adapted to mount an engine block to an associated vehicle.

Referring now to FIG. 15, an engine block mounting system 700 is illustrated. The mounting system 700 is adapted to mount an engine block 750 to a frame or uni-body of a vehicle, for example. The mounting system 700 includes a first plate 702 having spaced apart side edges 704, 706 and a second plate 708 having spaced apart side edges 710, 712. The first plate 702 is coupled to a front end of the engine block 750. The second plate 708 is coupled to a back end of the engine block 750. Each of the plates 702, 708 includes apertures 714 formed therein to receive fasteners 715 for coupling the plates 702, 708 to the engine block 750. It should be understood that the plates 702, 708 can be coupled to the engine block 750 employing a welding process or other joining process. Additional apertures may be formed in the plates 702, 708 for attaching other engine components to the engine block 750 and/or the plates 702, 708 such as an alternator, a compressor, a fluid pump, and a pulley, for example. Additionally, openings may be formed in the plates 702, 708 to provide for the passage of fluid conduits therethrough such as a coolant conduit and a refrigerant conduit, for example. It should be understood other openings can be formed in the plates 702, 708 as desired.

The side edges 704, 706, 710, 712 of the respective plates 702, 708 extend outwardly from the sides of the engine block 750. Elongate rods 716, 718 are disposed between the plates 702, 708 and are coupled thereto. It should be understood that the rods 716, 718 can be coupled to the plates 702, 708 employing threaded fasteners and welding processes, for example. The rods 716, 718 are substantially parallel to the sides of the engine block 750. Mounting holes 720 are formed in the plates 702, 708 adjacent the respective sides 704, 706, 710, 712 thereof. The mounting holes 720 are adapted to receive a fastener such as a threaded fastener or a pin, for example, to couple the plates 702, 708 to the frame or the uni-body of the vehicle. It should be understood that one or more brackets can be coupled to the plates 702, 708 and/or the frame or the uni-body of the vehicle to facilitate coupling the plates 702, 708 thereto. Additionally, it should be understood that a dampening member can be employed such as a rubber engine mount, for example, with the fasteners to couple the plates 702, 708 to the engine block 750 and the frame or the uni-body of the vehicle. Mounting the front end and the back end of the engine block 750 to the frame or uni-body using the mounting system 700 minimizes a twisting of the engine block 750 during an operation thereof. Further the mounting system 700 substantially isolates the engine block 750 from vibrations originating from suspension components of the vehicle. The minimized twisting of the engine block 750 and substantially isolating the engine block 750 from suspension vibrations minimizes distortion thereof and facilitates the use of the minimal clearances between mating internal engine components as previously described herein.

It should be understood that the brace 400 and the mounting system 700 can be used together to minimize a distortion of an associated engine block. The valley brace disclosed in U.S. Pat. No. 7,258,094 can also be used with the brace 400 and the mounting system 700 provided to minimize a distortion of the associated engine block. Additionally, the maximized cylinder wall thickness described hereinabove for the engine blocks 100, 200 can be employed with the associated engine block to maximize the rigidity thereof. Together, the brace 400, the mounting system 700, the valley brace, and the maximized cylinder wall thickness minimize a distortion of the engine block during the operation of the engine. The minimized distortion enables clearances between surfaces of the engine block and surfaces of adjacent engine components as well as clearances between surfaces of adjacent engine components to be minimized. As discussed hereinabove, the maximized rigidity and minimized distortion allows clearances of about 0.0002 inches to be employed. The reduced clearances maximize the efficient operation of the engine by minimizing undesired movements between surfaces of the engine block and surfaces of adjacent engine components and between surfaces of adjacent engine components.

The internal combustion engine, the associated components, and the method of operation provide for an internal combustion engine having a minimized fuel consumption.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An engine comprising:
    an engine block having at least one cylinder bank including a plurality of cylinder bores formed therein;
    a piston reciprocatingly disposed in each of the cylinder bores, the piston including a top surface having a skirt depending therefrom;
    a crankshaft rotatably mounted to the engine block, the crankshaft having at least one throw coupled thereto;
    a plurality of connecting rods having a first end and a second end, the first end rotatably attached to the crankshaft and the second end coupled to the piston;
    a cylinder head mounted to the cylinder bank and covering the cylinder bores, the cylinder head including an intake valve and an exhaust valve in fluid communication with each of the cylinder bores;
    an oil pan mounted to a lower end of the engine block to form a crankcase area of the engine;
    at least one first permanent magnet disposed on a surface of the piston adjacent the top surface of the piston and at least one second permanent magnet disposed on a surface of the throw;
    a plurality of electromagnets disposed in the engine block, a first set of the electromagnets disposed along a path of travel of the piston and adjacent the piston and a second set of the electromagnets disposed adjacent the throw;
    a control system selectively providing an electrical current to the first and second sets of electromagnets to produce a desired magnetic field, wherein the magnetic field of the first set of electromagnets cooperates with a magnetic field of the at least one first permanent magnet to selectively attract and repel the at least one permanent magnet and the second set of electromagnets cooperates with a magnet field of the at least one second permanent magnet to selectively attract and repel the at least one second permanent magnet to affect a motion of the piston in respect of the engine block.

2. The engine according to claim 1, further comprising a lubrication system including a fluid pump having a suction port and a discharge port, the suction port in fluid communication with a fluid disposed in the oil pan and the discharge port in fluid communication with a fluid conduit having a discharge end disposed within the engine adjacent a component thereof, the fluid pump causing a flow of the fluid from the oil pan through the fluid conduit and the fluid to be discharged from the discharge end adjacent the component, the lubrication system providing a fluid pressure of 2 psi.

3. The engine according to claim 1, further comprising a crankcase vacuum system including a fluid pump having a suction port and a discharge port, the suction port in fluid communication with the crankcase area of the engine and the discharge port in fluid communication the atmosphere, the fluid pump drawing air from the crankcase area and discharging the air to the atmosphere to create a pressure within the crankcase area lower than a pressure of the atmosphere.

4. The engine according to claim 1, wherein the at least one second permanent magnet disposed on the throw is coupled to an outer periphery of the throw.

5. The engine according to claim 1, wherein the at least one first permanent magnet disposed on the piston and the at least one second permanent magnet disposed on the throw are shaped as one of a ring, disk, cylinder, and sphere.

6. The engine according to claim 5, wherein the at least one first permanent magnet is shaped as a ring adapted to encircle the piston.

7. The engine according to claim 1, wherein the first and second sets of electromagnets are shaped as one of a ring, disk, cylinder, and sphere.

8. The engine according to claim 1, wherein the first set of electromagnets encircle the cylinder bore.

9. The engine according to claim 1, further comprising a spark plug received in the cylinder head and configured to provide an electrode within a combustion chamber defined by the cylinder head and the cylinder bores, wherein a third set of the electromagnets is formed as a winding around the spark plug.

10. The engine according to claim 1, wherein the connecting rods are magnetized.

11. The engine according to claim 1, further comprising a brace coupled to the engine block, wherein the brace at least one of supports and positions at least one of the first set of electromagnets.

\* \* \* \* \*